(12) United States Patent
Gao et al.

(10) Patent No.: US 7,219,748 B2
(45) Date of Patent: May 22, 2007

(54) DOWNHOLE SIGNAL SOURCE

(75) Inventors: Li Gao, Missouri City, TX (US); Paul F. Rodney, Spring, TX (US)

(73) Assignee: Halliburton Energy Services, Inc, Houston, TX (US)

( * ) Notice: Subject to any disclaimer, the term of this patent is extended or adjusted under 35 U.S.C. 154(b) by 222 days.

(21) Appl. No.: 10/856,439

(22) Filed: May 28, 2004

(65) Prior Publication Data

US 2005/0264293 A1    Dec. 1, 2005

(51) Int. Cl.
*G01V 3/08* (2006.01)
*E21B 47/12* (2006.01)

(52) U.S. Cl. .................. 175/45; 340/854.4; 340/854.6; 324/334; 324/339

(58) Field of Classification Search .................. 175/45; 324/339, 343, 326, 334; 166/250.01; 340/854.6, 340/854.4
See application file for complete search history.

(56) References Cited

U.S. PATENT DOCUMENTS

| | | |
|---|---|---|
| 4,700,142 A | 10/1987 | Kuckes |
| 4,845,434 A | 7/1989 | Kuckes et al. |
| 4,933,640 A | 6/1990 | Kuckes |
| 5,074,365 A | 12/1991 | Kuckes |
| 5,218,301 A | 6/1993 | Kuckes |
| 5,258,755 A | 11/1993 | Kuckes |
| 5,259,468 A | 11/1993 | Warren et al. |
| 5,467,832 A | 11/1995 | Orban et al. |
| 5,485,089 A | 1/1996 | Kuckes |
| 5,512,830 A | 4/1996 | Kuckes |
| 5,513,710 A | 5/1996 | Kuckes |
| 5,515,931 A | 5/1996 | Kuckes |
| 5,589,775 A | 12/1996 | Kuckes |
| 5,657,826 A | 8/1997 | Kuckes |
| 5,676,212 A | 10/1997 | Kuckes |
| 5,725,059 A | 3/1998 | Kuckes et al. |
| 5,923,170 A | 7/1999 | Kuckes |
| RE36,569 E | 2/2000 | Kuckes |
| 6,094,401 A | 7/2000 | Masak et al. |
| 6,234,259 B1 | 5/2001 | Kuckes et al. |
| 6,466,020 B2 | 10/2002 | Kuckes et al. |
| 6,626,252 B1 | 9/2003 | Kuckes |
| 6,736,222 B2 | 5/2004 | Kuckes et al. |
| 6,900,640 B2* | 5/2005 | Fanini et al. ............... 324/339 |
| 2004/0183538 A1* | 9/2004 | Hanstein et al. ............ 324/339 |
| 2004/0196047 A1* | 10/2004 | Fanini et al. ............... 324/339 |

* cited by examiner

*Primary Examiner*—Kenneth Thompson
(74) *Attorney, Agent, or Firm*—Conley Rose, PC

(57) ABSTRACT

A signaling apparatus comprises a magnet and a shield moveable relative to the magnet. The shield is moveable relative to the magnet between a first position in which the magnet is relatively exposed and a second position in which the magnet is relatively shielded. The apparatus can include a synchronization signal source, a downhole sensor signal source, and/or means for modulating the magnetic field in response to the signal from any source. A method of using the signaling apparatus to locate a bottomhole assembly includes moving the shield so as to modulate the magnetic field created by the magnet, sensing the modulation of the magnetic field, and determining the location of the bottomhole assembly using the information collected. The BHA can be located using phase shift or amplitude measurements. Receivers detecting the modulated magnetic field can be at or below the earth's surface.

21 Claims, 6 Drawing Sheets

DOWNHOLE SIGNAL SOURCE

CROSS-REFERENCE TO RELATED APPLICATIONS

Not Applicable.

STATEMENT REGARDING FEDERALLY SPONSORED RESEARCH OR DEVELOPMENT

Not Applicable.

GENERAL FIELD OF THE INVENTION

The present invention relates generally to methods and apparatus for signaling from one location to another using low frequency magnetic fields. The invention can be used to send a signal from a location near a drill bit in a well drilling operation to a receiver at the earth's surface, or to a receiver at a different location in the drillstring in the same well, or to a receiver in another well. These and other features of the invention are described in detail below.

BACKGROUND OF THE INVENTION

In common practice, when it is desired to produce hydrocarbons from a subsurface formation, a well is drilled from the surface until it intersects the desired formation. As shown in FIG. 1, a typical drilling operation entails a surface operating system 50, a work string 100 that may comprise coiled tubing or assembled lengths of conventional drill pipe, and a bottom hole assembly (BHA) 200. Surface system 50 typically includes a drilling rig 10 at the surface 12 of a well, supporting drill string 100. BHA 200 is attached to the lowermost end of work string 100. Operating system 50 is positioned at the surface adjacent to well 12 and generally includes a well head disposed atop of a well bore 18 that extends downwardly into the earthen formation 20. Borehole 18 extends from surface 16 to borehole bottom 30 and may include casing 22 in its upper zones.

The productivity of formations can vary greatly, both vertically and horizontally. For example, in FIG. 1, formation 21 may be a producing formation (stratum), while formation 20 above it may be a non-producing formation. The target formation(s) have typically been mapped using various techniques prior to commencement of drilling operations and an objective of the drilling operation is to guide the drill bit so that it remains in the target formation. Thus, in many wells, the lower portion of the borehole deviates from the vertical and may even attain a substantially horizontal direction. In these circumstances, it is desirable to drill the well such that borehole 18 stays within the producing formation 21.

Similarly, it is sometimes desired to guide the drilling of a well such that it parallels another well. This is the case in steam-assisted gravity drainage (SAGD) drilling, in which steam injected through one of a pair of parallel wells warms the formation in the vicinity of the wells, lowering the viscosity of the formation fluids and allowing them to drain into the second well. The second well thus functions as a production well and typically is drilled such that it lies below the injection well.

As a result of this deviated, directional, or horizontal drilling, the drill bit may traverse a sizable lateral distance between the wellhead and the borehole bottom. For this reason, and because the degree of curvature of the borehole is often not known precisely, it also becomes difficult to know the true vertical depth of the borehole bottom. Hence, it is preferred to track the position of the bit as precisely as possible in order to increase the likelihood of successfully penetrating the target formation.

It is particularly desirable to accurately locate the position of the bottom hole assembly (BHA) during drilling so that corrections can be made while drilling is ongoing. Determining the precise location of the drill bit as it progresses through the formation and communication of that information from the downhole location to the surface are two significant problems that have not heretobefore been adequately addressed. Both objectives are made more difficult by the drilling operation itself, which involves at least rapid fluid flow, moving parts, and vibrations.

Various methods are traditionally combined to achieve these goals. Gyroscopes and various types of sensors have been used to track bit movement and/or bit position. Electromagnetic (EM) telemetry is one technique used for transmitting information, either to the surface or to another location uphole. Other transmission techniques involve mud pulses or acoustic signaling using the drillstring as the signal carrier. Current techniques are not very accurate or rapid, however, and can result in erroneous calculations of the position of the BHA. Hence, it is desirable to provide a technique for determining the position of a bit in a subterranean formation that eliminates or at least substantially reduce the problems, limitations and disadvantages commonly associated with the known bit-tracking techniques.

SUMMARY OF PREFERRED EMBODIMENTS OF THE INVENTION

The present invention provides methods and apparatus for signaling from one location to another using low frequency magnetic fields. The invention has many applications and can be used, for example, to locate the position of the bottom hole assembly during drilling. The invention can be used to send a signal from a location near a drill bit in a well drilling operation to a receiver at the earth's surface, or to a receiver at a different location in the drillstring in the same well, or to a receiver in another well. The invention can also be used for generating a signal at the earth's surface that can be detected at a downhole location, or as a telemetry transmitter for low frequency communications.

In some embodiments, the apparatus of the present invention is particularly useful as a tool for sending a signal from the bit location that can be detected at the surface and used to determine the location of the bit. The present invention avoids the deficiencies of prior devices and offers an alternative way to determine the position of the BHA. In preferred embodiments, the invention includes placing a signaling apparatus at the bit and tracking its position during the entire drilling process. For this method to work, the signal source must be strong and stable enough even for deep end extended-reach wells.

In certain embodiments, a synchronization signal and using said synchronization signal is provided and used to control modulation of the magnetic field created by the magnet. Controlling the modulation of the magnetic field may include doubling the frequency of, taking the absolute value of, or squaring the synchronization signal. The modulated magnetic field can be sensed by receivers that may detect a phase shift between said synchronization signal and said modulated magnetic field and or amplitude variations in said modulated magnetic field. There may be a plurality of receivers spaced apart from said bottomhole assembly, and the receivers may be located at or below the earth's surface.

In alternative embodiments, the invention can also be used to generate a signal at the earth's surface that can be detected at a downhole location.

In some embodiments of the present invention, the signal source may be a rare earth permanent magnet used in conjunction with a shield made of high permeability soft magnetic alloy. By precisely controlling the motion of the shield, the permanent magnet can be made to function as a precise oscillating signal source that can be tracked by magnetometers at the surface for accurate position monitoring of the BHA. In alternative embodiments, the frequency and/or phase etc. of the motion of the shield can be modulated in response to data acquired by downhole instruments using well-known digital encoding schemes, transforming the signal source into a transmitter that can communicate LWD data to surface receivers.

In certain embodiments, the present invention comprises a magnet and a shield moveable relative to said magnet between a first position in which said magnet is relatively exposed and a second position in which said magnet is relatively shielded. The magnet can be an electromagnet. The present system may further comprise means for providing a synchronization signal and means for controlling movement of the shield in response to the synchronization signal so as to modulate the magnetic field created by the magnet. The means for controlling the shield movement may include means for doubling the frequency of, taking the absolute value of, and/or squaring the synchronization signal. The apparatus may further include a downhole sensor generating a signal and means for modulating the magnetic field in response to the signal from the downhole sensor.

Thus, the embodiments of the invention summarized above comprise a combination of features and advantages that enable them to overcome various problems of prior devices systems and methods. The various characteristics described above, as well as other features, will be readily apparent to those skilled in the art upon reading the following detailed description of the preferred embodiments of the invention, and by referring to the accompanying drawings.

It should be appreciated that the present invention is described in the context of a well environment for explanatory purposes, and that the present invention is not limited to the particular borehole thus described, it being appreciated that the present invention may be used in a variety of well bores.

BRIEF DESCRIPTION OF THE DRAWINGS

For a more detailed description of the preferred embodiments of the present invention, reference will now be made to the accompanying drawings, wherein.

DETAILED DESCRIPTION OF THE PREFERRED EMBODIMENTS

In the following discussion and in the claims, the terms "including" and "comprising" are used in an open-ended fashion, and thus should be interpreted to mean "including, but not limited to . . . ". Also, reference to "up" or "down" are made for purposes of ease of description with "up" meaning towards the surface of the wellbore and "down" meaning towards the bottom of the wellbore. In addition, in the discussion and claims that follow, it is sometimes stated that certain components or elements are "electrically connected." By this it is meant that the components are directly or indirectly connected such that an electrical current or signal could be communicated between them.

According to the present invention, the strong magnetic moment of the rare earth permanent magnet is used together with the shield made of high permeability soft magnetic alloys. By precisely controlling the motion of the shield, the permanent magnet is transformed into a precise oscillating signal source that can be tracked by magnetometers at the surface for accurate position monitoring of the BHA. Alternatively, the speed/phase etc. of the motion of the shield can be modulated with data acquired by downhole instruments through well-known digital encoding scheme, thus transform the signal source into a transmitter that can communicate LWD data to surface receivers.

Figure 1:
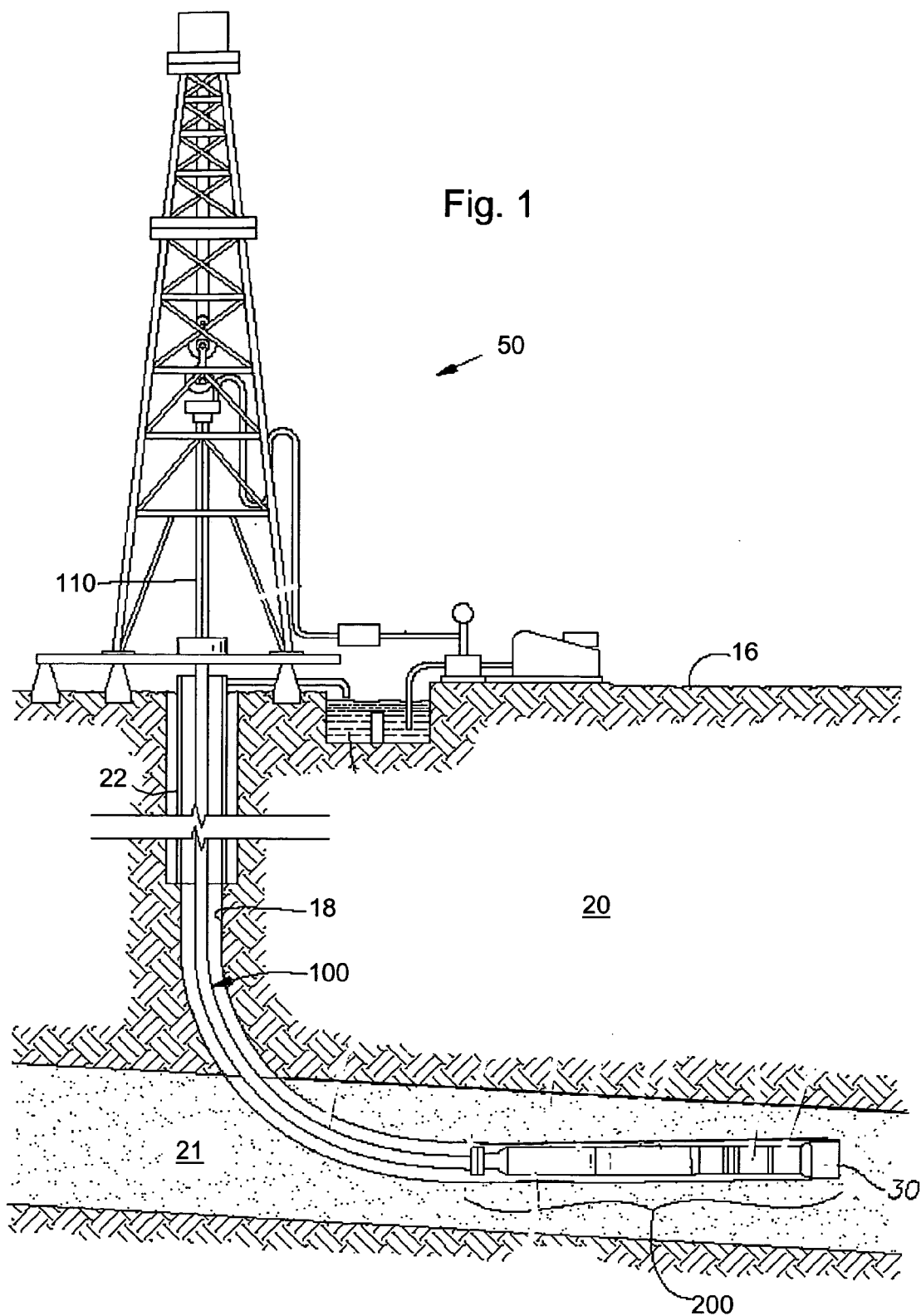
FIG. 1 is a schematic elevation view, partly in cross section, of a drillstring including a bottom hole assembly (BHA) in a subterranean well.
Figure 2:
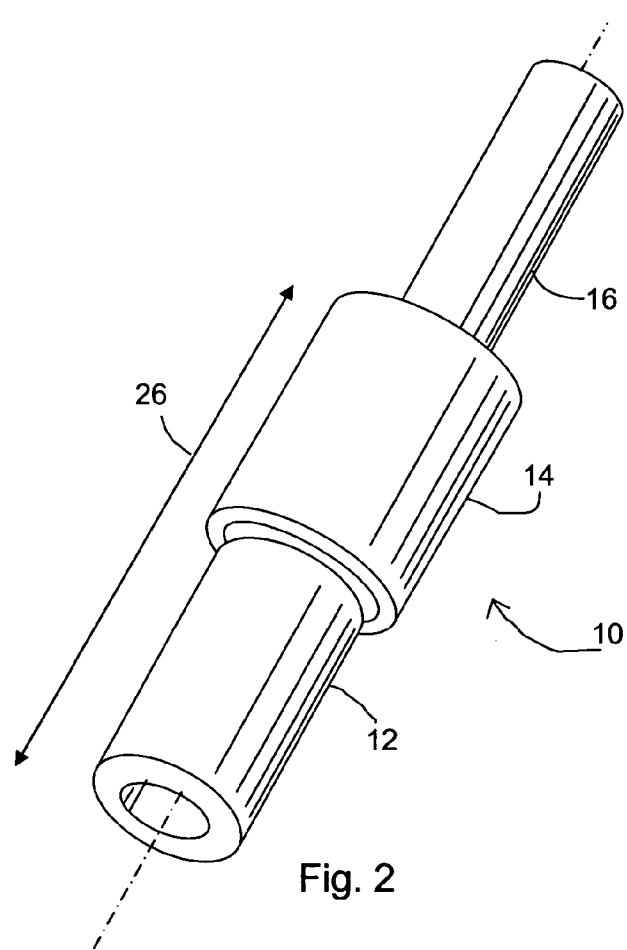
FIG. 2 is a simplified perspective view of a signal source in accordance with a preferred embodiment of the invention.
Figure 3:
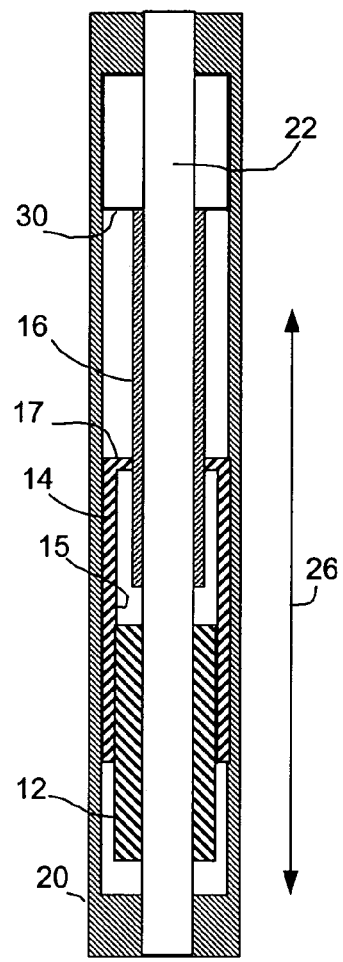
FIG. 3 is a cross sectional view of the signal source of FIG. 2 incorporated into a downhole tool.

Referring now to FIGS. 2 and 3, one preferred embodiment of a signal source 10 in accordance with the present invention includes a permanent magnet 12, a magnetic shield 14, and a drive mechanism 16 for shifting shield 14 relative to magnet 12. Magnetic shield 14 is slidable axially into and out of surrounding engagement with magnet 12, as indicated by arrow 26. Drive mechanism 16 engages one end of shield 14 and provides the motive force needed to advance and retract the shield. Referring now particularly to FIG. 3, signal source 10 is preferably mounted inside a cylindrical non-magnetic drill collar 20, along with a drive means 30. The assembly formed in this manner preferably has a central bore 22 therethrough such that the drill collar can be included in a drill string.

In the embodiment shown in FIGS. 2 and 3, magnet 12 is generally cylindrical and shield 14 likewise comprises a cylindrical shell. Shield 14 preferably includes an end cap 17 and a cylindrical inner surface 15 having a diameter only slightly larger than the outside diameter of magnet 12. Shield 14 is preferably moveable between first and second positions in which magnet 12 is, respectively, exposed and shielded.

In FIG. 3, shield 14 is shown in an intermediate position, with magnet 12 partially exposed and partially shielded. The length of arrow 26 illustrates an approximate range of movement for shield 14. As shield 14 moves along the length of magnet 12, the fraction of magnet 12 that is exposed changes. Correspondingly, the magnetic field emanating from magnet 12 changes as shield 14 attenuates it. When magnet 12 is wholly within shield 15, the magnetic field emanating from the tool 100 will at its minimum. In certain embodiments, the movement of shield 14 relative to magnet 12 can be controlled so as to produce a sinusoidal modulation of the magnetic field that extends beyond the tool. Likewise, the movement of shield 14 can be controlled such that the magnetic field cycles in a sawtooth manner, or according to any preferred function or modulation.

Figure 4:
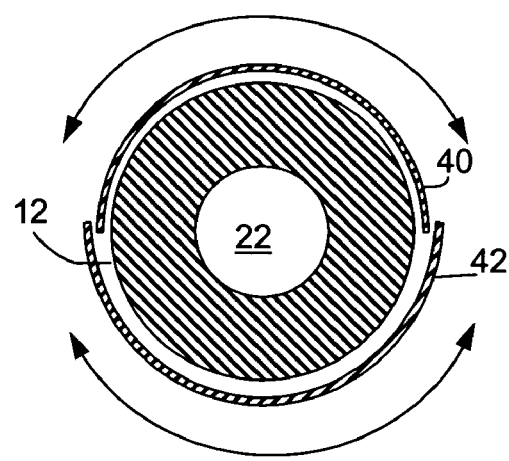
FIGS. 4 and 5 are end views of a signal source in accordance with a first alternative embodiment, in closed and open positions, respectively.
Figure 5:
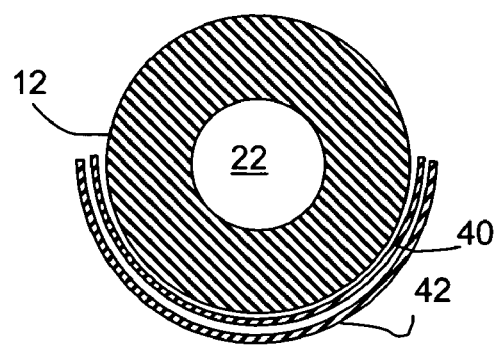

In an alternative embodiment of the invention, depicted in FIGS. 4 and 5, the shield consists of two or more partial circumferential sections 40, 42. Sections 40, 42 are preferably configured such that together they can be closed to form a shield that encloses the circumference of magnet 13.

Figure 6:
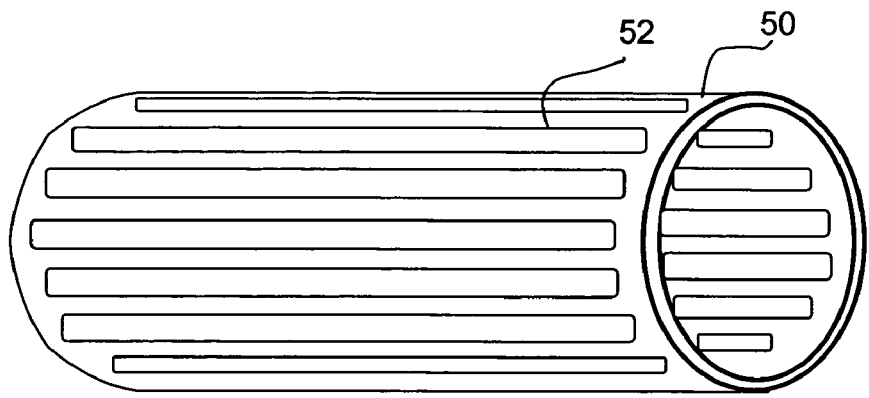
FIG. 6 is a simplified view of a slotted sleeve that can be used in certain embodiments of the present invention.

In still another embodiment, shown in FIG. 6, the shield can comprise two or more concentric cylindrical shells, each generally having the configuration shown at 50 and each having a plurality of longitudinal slots 52 therethrough. The magnet is disposed within the innermost shell. When the concentric shells are positioned such that the slots in each shell are aligned with the slots in the other shell(s), the magnet is exposed. Similarly, when the shells are positioned such that the slots do not align, the magnet is shielded.

It will be understood that the configurations shown herein are merely illustrative of the manner in which the magnetic material and the shield could be configured. Various other arrangements of the components of the tool will be understood by those skilled in the art.

Magnet

In order to have the highest available magnetic energy, rare-earth based permanent magnets such as Nd/Fe/B and Sm/Co are preferred. With a magnetic energy $(BxH)_{max}$ in excess of 200 KJ/m$^3$, Nd/Fe/B magnets are the strongest permanent magnets available today. Sm/Co magnets typically have a lower magnetic energy, at about 150 KJ/m$^3$.

Figure 7:
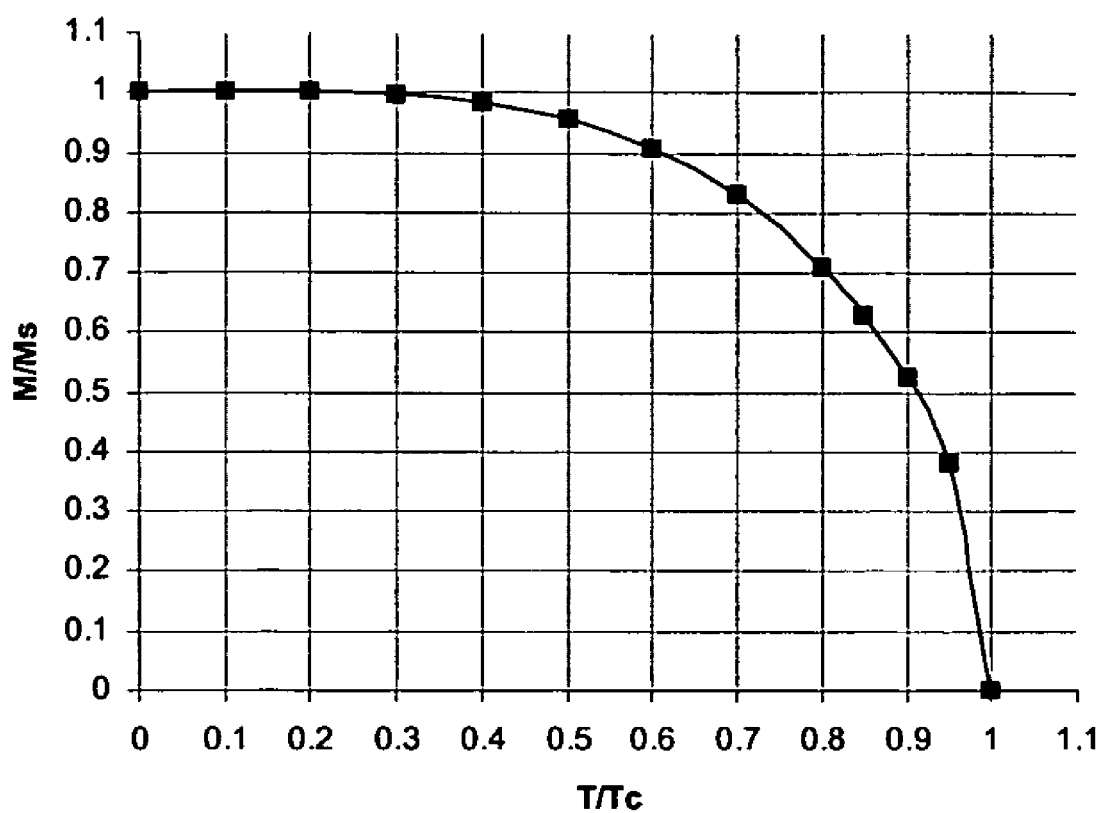
FIG. 7 is a plot illustrating the dependence of magnetization on temperature, where $M_s$ is the saturation magnetization.

As is known, permanent magnets are made of ferromagnetic materials. One of the characteristics of ferromagnetic materials is the existence of a critical temperature ($T_c$) called Curie temperature. Above this temperature, ferromagnetic materials lose their magnetization and become paramagnetic. The transition is gradual within a temperature range; even before the temperature of the magnet reaches its Curie temperature, the magnet starts to lose its magnetization. This behavior can be described by the molecular field theory that gives the temperature dependence depicted in FIG. 7. Hence, if a permanent magnet is to maintain 80% of its magnetization in the downhole environment, it must operate in temperatures no higher than 0.7 x $T_c$, where $T_c$ is the Curie temperature. For $Sm_2Co_{17}$, $T_c$ is 700–800° C., while it is 300–350° C. for $Nd_2Fe_{14}B$. Therefore, for deep wells where the bottom hole temperature is high, $Sm_2Co_{17}$ magnets are preferred.

Shield

In order to modulate the strength of the permanent magnet, shield 14 is preferably made of a magnetically soft alloy such as Mumetal® (Ni/Fe/Cu/Mo) or Supermalloy, with high magnetic permeability. Various suitable magnetically soft metals are known in the art, including CO-NETIC AA®, which has a high magnetic permeability and provides high attenuation, and NETIC S3–6®, which has a high saturation induction rating that makes it particularly useful for applications involving strong magnetic fields. NETIC S3–6 and CO-NETIC AA are trademarks of Magnetic Shield Corp., 740 N. Thomas Drive, Bensenville, Ill. 60106. In embodiments where it is desired to achieve very high attenuation ratios in a very strong field, it may be preferred to use both alloys. In these instances, the NETIC S3–6 alloy is preferably positioned closest to the source of the field so as to protect the CO-NETIC AA alloy from saturation. Alternative metals that are suitable for use in shield 14 include but are not limited to Amumetal® and Amunickel® from Amuneal Manufacturing Corp., 4737 Darrah Street, Philadelphia, Pa. 19124, USA.

Motor

Motive force for moving shield 14 relative to magnet 12 is preferably provided by drive means 30, which is housed inside drill collar 20. Drive means 30 is preferably an electric motor, but can be any other suitable mechanical drive device. It will be understood that, depending on the type of power source selected, it may be necessary to provide gearing and the like in order to allow drive means 30 to cause the desired movement of shield 14, whether that be rotational, translational, or other.

Use of the Downhole Transmitter

As mentioned above, one preferred use for a transmitter of the type disclosed herein is as a field source for a downhole absolute positioning system. The purpose of such a system is to allow a precise determination of the position of the bottomhole assembly. This can be done by using the present signal source to generate an ultralow frequency signal (0.1 Hz to 0.01 Hz, depending on depth, with greater depths requiring lower frequencies) that is extremely stable and precisely synchronized with a surface clock. The transmitter itself can be a transmitter of the type herein disclosed or a large electromagnet. A highly stable synchronization signal makes it possible to operate in a very narrow bandwidth, which in turn makes it possible to receive the signal with a minimum of noise and improves the quality of the resulting telemetry.

When the present invention is used to assist in location of a bottomhole assembly, for example, it is preferably positioned in the drillstring adjacent to the BHA. The present signaling devices may not be in physical contact with the BHA, but the greater the distance between the BHA and the signaling apparatus, the less precise will be the information relating to location of the BHA. Because precise location of the signal source is achieved by a combination of phase shift and amplitude measurements, timing is particularly important in this embodiment.

In other embodiments, the downhole signal source need not be synchronized to an synchronization signal. This type of system can be used when it is desired to generate a signal at the earth's surface that can be detected at a downhole location, or when the system is used as a telemetry transmitter for low frequency communications. In still other embodiments, an array of three or more surface sensors can be used locate the signal source using triangulation techniques, with or without a synchronization source.

In spite of the frequency stability requirement, it is not necessary to carry a precise clock (good to about 1 millisecond over 200 hours) downhole. Nonetheless, in some embodiments, a downhole clock may be preferred. In one embodiment, illustrated in FIG. 8, a precise clock 100 is located at the earth's surface. Clock 100 is used to synchronize a system that includes a downhole signal source in accordance with the present invention. In the embodiment shown in FIG. 8, clock 100 is electrically connected to a surface sine wave transmitter 112, which in turn is electrically connected to a surface antenna 114. Clock 100 can be an atomic clock, a clock obtained from the GPS system, an over controlled system of oscillators, or any other suitable precise clock.

Figure 8:
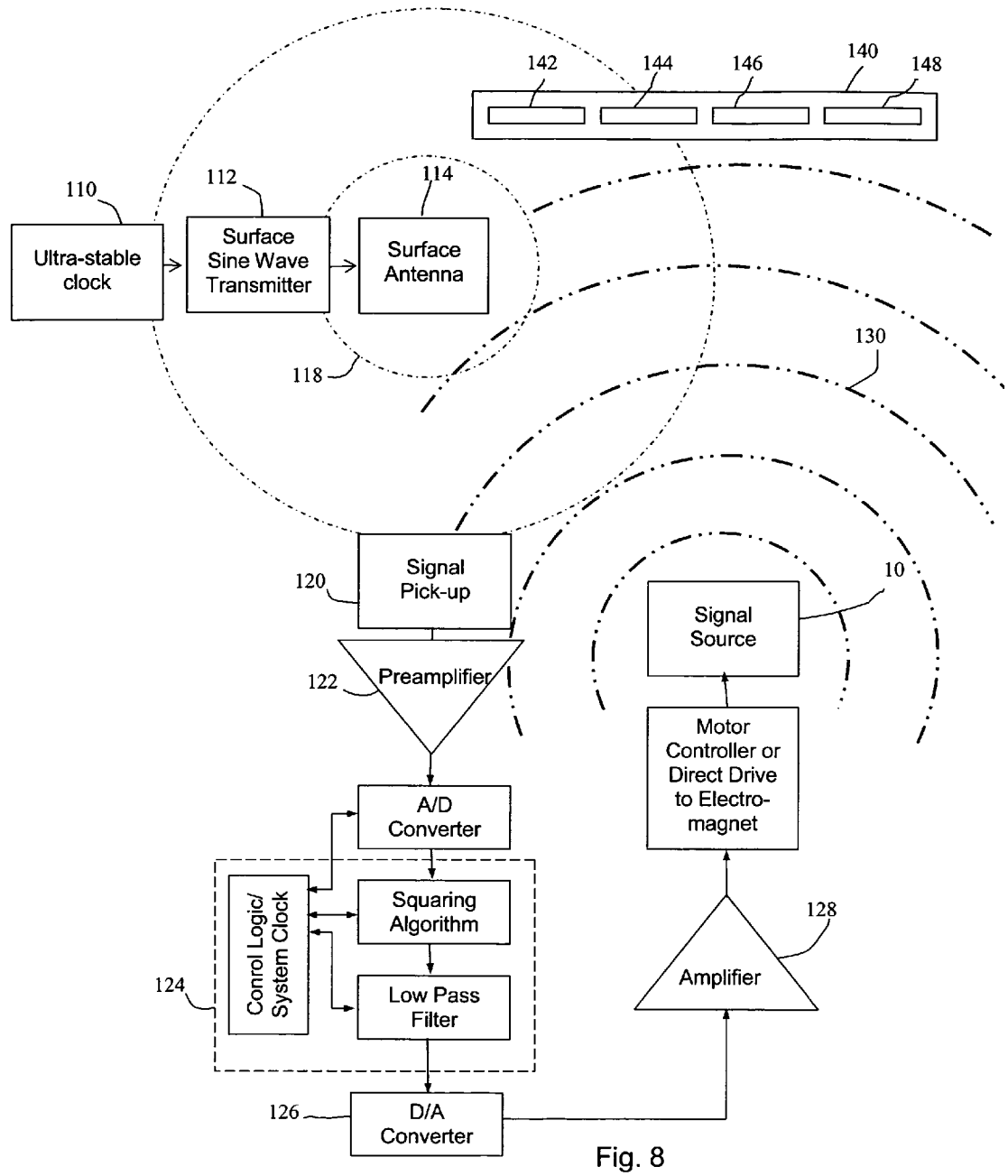
FIG. 8 is a schematic diagram illustrating an embodiment of a system incorporating a signal source in accordance with the present invention.

Still referring to FIG. 8, a signal 118 from surface antenna 114 is transmitted through the earth and are received at a downhole receiver 120. The received signal from the downhole receiver 120 is preferably passed through a preamplifier 122 into a digital-to-analog converter and then through signal processing means that use the received signal to synchronize the downhole system. In a preferred embodiment, the signal processing means comprise a CPU 124 that applies a squaring algorithm and a low pass filter to the received signal. CPU 124 also implements control logic that drives a downhole system clock. The output of the low pass filter is preferably sent to a digital-to-analog (D/A) converter 126. The output of D/A converter 126 is preferably amplified by an amplifier and then used to control drive means 30. In embodiments where an electromagnet is used, the output of the D/A converter can be used to operate to the electromagnet, preferably with amplification.

Regardless of the source of the drive signal, the signal source 10 ultimately generates a signal 130 that comprises a variable magnetic field. Signal 130 is detected by a sensing device 140, which preferably comprises an array of at least two receivers 142, 144, 146, 148. Sensing device 140 may or may not be located near antenna 114. If a surface synchronization source is used, the phase and/or amplitude of the received signal 130 can be used to locate the signal source. Timing-induced errors can be mitigated by using a digital phase lock loop circuit or other suitable means. In alternative embodiments, the frequency and/or the phase of signals 130 can be modulated so as to transmit signals from the borehole bottom to the surface, such as, for example, signals indicative of measurements made by downhole sensors and/or MWD equipment.

Figure 9:
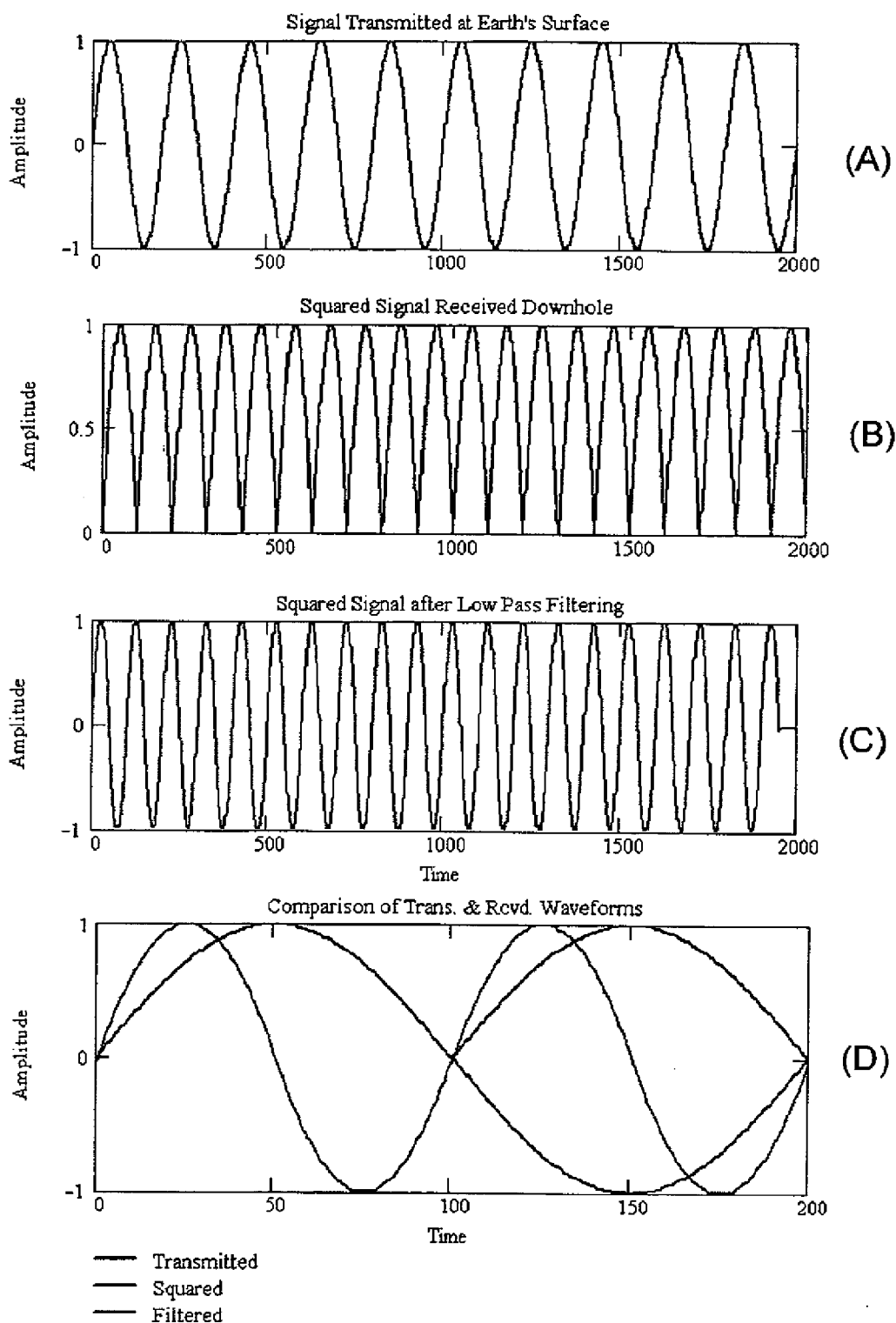
FIGS. 9A–D are plots illustrating a transmitted signal (A), the same signal after squaring (B), the squared signal after filtering (C), and a comparison of all three modes through one cycle of the original signal (D).

Clock 100 is preferably used to generate a sine wave at one-half the frequency of the signal that is to be transmitted by the downhole transmitter (FIG. 9A). In an alternative embodiment, the clock signal can be induced directly into the drillstring and sensed as an electric field across an insulating gap in the bottomhole assembly or by any other current-sensing means. It is well known that if a sinusoidal signal is squared, that the resulting signal contains only even harmonics of the fundamental signal. In particular, the Fourier series representation of a rectified sine wave is given by Equation (1) and is illustrated in FIG. 9B.

$$|\sin(\omega \cdot t)| = \frac{2}{\pi} - \frac{2}{\pi} \cdot \sum_{n=1}^{\infty} \frac{2}{(2 \cdot n)^2 - 1} \cdot \cos(2 \cdot n \cdot \omega \cdot t) \quad (1)$$

Whether the procedure is carried out using analog electronics or digital electronics, the concept is the same: take the absolute value of the received signal (or square it) and low pass filter it (FIG. 9C). The fundamental frequency of the resulting signal will be exactly twice that of the transmitter at the earth's surface. The signal will contain higher order harmonics which can be filtered out downhole, if desired (the higher the order of the harmonic, the more this signal will be attenuated as it propagates through the earth, back to the earth's surface). FIG. 8 illustrates one possible way of carrying a preferred procedure out using mostly digital electronics. It should be appreciated that the digital functions could be replaced with analog functions if desired, but since the frequencies used are so low, the required signal processing is well within the capabilities of present technology.

FIGS. 9A–D illustrate the waveforms, individually and together (9D) that result in a preferred signal processing technique that is suitable for use in the present invention. It will be understood that any other synchronization signal source or other signal processing techniques can be used in the present invention and that the signal(s) need not be sinusoidal.

ADVANTAGES

Compared with active sources using active dipole source energized by alternating current, the new signal source will be stronger, more stable, and more accurate. The present signal source can be used to precisely locate a BHA while drilling. It can also be used to improve depth reference in wireline logging operations by reducing errors related to cable stretching due to thermal expansion, sticking/stuck wireline tools, etc. Coupled with digital coding schemes, the present signal source can also be employed as a transmitter to send downhole tool and or formation data to surface receivers, thus provide an additional communication channel for LWD.

While certain preferred embodiments have been disclosed and described, it will be understood that various modifications may be made thereto without departing from the scope of the invention. For example, the type, size and configuration of the magnet and of the shield can be varied. Likewise, the mode of movement of the shield relative to the magnet can be altered or varied. To the extent that the claims include a sequential recitation of steps, it will be understood that those steps need not be completed in order and that it is not necessary to complete one step before commencing another.

What is claimed is:

1. A method of locating a bottomhole assembly in a well, comprising:
   a) providing a signaling device coupled to said bottomhole assembly, said signaling device comprising a magnet and a shield moveable relative to said magnet;
   b) mechanically moving said shield relative to said magnet so as to modulate the magnetic field created by said magnet;
   e) sensing said modulation of the magnetic field; and
   d) determining the location of the bottomhole assembly using information collected in step c).

2. The method according to claim 1 wherein said magnet comprises a permanent magnet and said magnetic shield is moveable relative to said magnet between a first position in which said magnet is relatively exposed and a second position in which said magnet is relatively shielded.

3. The method according to claim 1 wherein said magnet comprises an electromagnet.

4. The method according to claim 1 wherein step c) includes detecting amplitude variations in said modulated magnetic field.

5. The method according to claim 1, further including generating a signal using a downhole sensor and modulating the magnetic field created by said magnet in response to said signal from said downhole sensor.

6. The method according to claim 1, further including generating a signal using a downhole sensor and moving said shield in response to said sensor signal so as to modulate the magnetic field created by said magnet.

7. A method of locating a bottomhole assembly in a well, comprising:
   a) providing a signaling device coupled to said bottomhole assembly, said signaling device comprising a magnet and a shield moveable relative to said magnet;
   b) using said shield to modulate the magnetic the field created by said magnet;
   c) sensing said modulation of the magnetic field;

d) determining the location of the bottomhole assembly using information collected in step c); and
e) providing a synchronization signal and using said synchronization signal to control modulation by said shield of the magnetic field created by said magnet.

8. The method according to claim 1, further including controlling said modulation in response to said synchronization signal.

9. The method according to claim 8 wherein said controlling step includes doubling the frequency of said synchronization signal.

10. The method according to claim 8 wherein step c) includes detecting a phase shift between said synchronization signal and said modulated magnetic field.

11. The method according to claim 8 wherein step c) includes detecting amplitude variations in said modulated magnetic field.

12. A method of locating a bottomhole assembly in a well, comprising:
a) providing a signaling device coupled to said bottomhole assembly, said signaling device comprising a magnet and a shield moveable relative to said magnet;
b) moving said shield so as to modulate the magnetic field created by said magnet;
c) sensing said modulation of the magnetic field; and
d) determining the location of the bottomhole assembly using information collected in step c): and
e) providing a plurality of receivers spaced apart from said bottomhole assembly,
wherein step c) includes using said receivers to detect said modulation.

13. The method according to claim 12 wherein said receivers are located below the earth's surface.

14. The method according to claim 12 wherein said receivers are located at the earth's surface.

15. A method of locating a bottomhole assembly in a well, comprising:
a) providing a signaling device coupled to said bottomhole assembly, said signaling device comprising a magnet and a shield moveable relative to said magnet;
b) providing a synchronization signal
c) rising said synchronization signal to control modulation of the magnetic field created by said magnet by moving said shield in response to said signal;
d) detecting said modulation of the magnetic field; and
e) determining the location of the bottomhole assembly using information collected in step d).

16. The tool according to claim 15 wherein step c) includes doubling the frequency of said synchronization signal.

17. The method according to claim 15 wherein step e) includes detecting a phase shift between said synchronization signal and said modulated magnetic field.

18. The method according to claim 15 wherein step e) includes detecting amplitude variations in said modulated magnetic field.

19. The method according to claim 15, further including providing a plurality of receivers spaced apart from said bottomhole assembly, wherein step e) includes using said receivers to detect said modulation.

20. The method according to claim 19 wherein said receivers are located below the earth's surface.

21. The method according to claim 19 wherein said receivers are located at the earth's surface.

* * * * *